(12) United States Patent
Nakamura

(10) Patent No.: US 11,611,169 B2
(45) Date of Patent: Mar. 21, 2023

(54) BOARD-TO-BOARD ELECTRICAL CONNECTOR WITH REINFORCED END PORTIONS

(71) Applicant: JAPAN AVIATION ELECTRONICS INDUSTRY, LIMITED, Tokyo (JP)

(72) Inventor: Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 17/195,063

(22) Filed: Mar. 8, 2021

(65) Prior Publication Data

US 2021/0408720 A1 Dec. 30, 2021

(30) Foreign Application Priority Data

Jun. 29, 2020 (JP) .............................. JP2020-111351

(51) Int. Cl.
*H01R 13/504* (2006.01)
*H01R 12/71* (2011.01)
(Continued)

(52) U.S. Cl.
CPC ........... *H01R 13/504* (2013.01); *H01R 12/71* (2013.01); *H01R 12/712* (2013.01); *B29C 45/00* (2013.01);
(Continued)

(58) Field of Classification Search
CPC .... H01R 13/504; H01R 12/71; H01R 12/712; H01R 12/714; H01R 13/405; H01R 13/5216; H01R 43/24; H01R 13/20; H01R 13/6582; H01R 12/707; H01R 12/716; H01R 12/73; B29C 45/00
(Continued)

(56) References Cited

U.S. PATENT DOCUMENTS 11,239,612 B2 * 2/2022 Lee ..................... H01R 13/6582
2020/0127400 A1 * 4/2020 Sasayama .......... H01R 12/7005
2020/0235506 A1 * 7/2020 Hosoda ................ H01R 12/716

FOREIGN PATENT DOCUMENTS

JP 2018147820 A 9/2018
JP 2021064545 A * 4/2021 ........... H01R 12/716

* cited by examiner

*Primary Examiner* — Abdullah A Riyami
*Assistant Examiner* — Justin M Kratt
(74) *Attorney, Agent, or Firm* — Muncy, Geissler, Olds & Lowe, P.C.

(57) ABSTRACT

A connector includes a plurality of contacts made of metal material and arranged in an arrangement direction orthogonal to a fitting direction, an insulator made of insulating resin material and holding the plurality of contacts, and a reinforcement terminal made of metal material and attached to an end portion of the insulator in the arrangement direction, the insulator including a fitting portion extending along the arrangement direction and projecting in the fitting direction for fitting to a portion to be fitted of the counter connector, the reinforcement terminal including a terminal accommodating portion of recess shape for accommodating a reinforcement terminal of the counter connector, and a wall portion facing an end portion of the fitting portion in the arrangement direction across the terminal accommodating portion, the reinforcement terminal including a resin material flow passage penetrating the wall portion and reaching the end portion of the fitting portion.

11 Claims, 10 Drawing Sheets

(51) Int. Cl.
    *H01R 43/24*           (2006.01)
    *H01R 13/405*         (2006.01)
    *H01R 13/52*          (2006.01)
    *H01R 13/6582*        (2011.01)
    *H01R 12/70*          (2011.01)
    *B29C 45/00*          (2006.01)
    *H01R 12/73*          (2011.01)
    *H01R 13/20*          (2006.01)

(52) U.S. Cl.
    CPC .......... *H01R 12/707* (2013.01); *H01R 12/714* (2013.01); *H01R 12/716* (2013.01); *H01R 12/73* (2013.01); *H01R 13/20* (2013.01); *H01R 13/405* (2013.01); *H01R 13/5216* (2013.01); *H01R 13/6582* (2013.01); *H01R 43/24* (2013.01)

(58) Field of Classification Search
    USPC ........................................................ 439/736
    See application file for complete search history.

BOARD-TO-BOARD ELECTRICAL CONNECTOR WITH REINFORCED END PORTIONS

BACKGROUND OF THE INVENTION

The present invention relates to a connector, particularly to a connector that is mounted on a substrate and is to be fitted to a counter connector along a fitting direction.

Conventionally, a connector that is mounted on a substrate and is to be fitted to a counter connector along a fitting direction has been known.

As an example, JP 2018-147820 A discloses an electrical connector comprising a receptacle connector 1 and a plug connector 2 that is fitted to the receptacle connector 1 along a fitting direction DF, as shown in FIG. 29.

The receptacle connector 1 includes a plurality of first contacts 3 arranged on each of opposite sides across a first central axis C1, a first insulator 4 holding the plurality of first contacts 3, and a pair of first reinforcement terminals 5 made of metal and separately attached to opposite ends along the first central axis C1 of the first insulator 4. Meanwhile, the plug connector 2 includes a plurality of second contacts 6 arranged on each of opposite sides across a second central axis C2, a second insulator 7 holding the plurality of second contacts 6, and a pair of second reinforcement terminals 8 made of metal and separately attached to opposite ends along the second central axis C2 of the second insulator 7.

The first insulator 4 of the receptacle connector 1 includes a fitting portion 4A of substantially cuboid shape extending along the first central axis C1 and projecting in the fitting direction DF toward the plug connector 2, while the second insulator 7 of the plug connector 2 includes a portion to be fitted of recess shape (not shown) extending along the second central axis C2 and opening in the fitting direction DF toward the receptacle connector 1, and, accordingly, the receptacle connector 1 and the plug connector 2 are configured such that, when fitted to each other, the fitting portion 4A is fitted to the portion to be fitted of the plug connector 2.

Each of the first reinforcement terminals 5 of the receptacle connector 1 includes a reinforcement portion 5A exposed in the fitting direction DF from the fitting portion 4A toward the plug connector 2 at an end portion 4B along the first central axis C1 of the fitting portion 4A, and a wall portion 5B facing the end portion 4B of the fitting portion 4A. Between the reinforcement portion 5A and the wall portion 5B, formed is a terminal accommodating portion 5C of recess shape for accommodating the second reinforcement terminal 8 of the plug connector 2 when the receptacle connector 1 and the plug connector 2 are fitted to each other.

Generally, the receptacle connector 1 of this type is produced through the so-called insert-molding, in which the first reinforcement terminal 5 is preliminarily disposed in a mold (not shown), and a molten resin that is a material for forming the first insulator 4 is then poured into the mold, whereby the first insulator 4 is molded integrally with the first reinforcement terminal 5.

In the meantime, in order to prevent the terminal accommodating portion 5C of recess shape situated between the first reinforcement portion 5A and the wall portion 5B of the first reinforcement terminal 5 from being filled with the molten resin, the terminal accommodating portion 5C is covered by part of the mold when the first reinforcement terminal 5 is disposed in the mold. Accordingly, as shown in FIG. 30, for instance, when a gate G of the mold is set outside the first reinforcement terminal 5 along the first central axis C1, a molten resin R poured into the mold through the gate G flows in a direction along the first central axis C1 as passing opposite end portions in a width direction DW of the first reinforcement terminal 5 and thereafter flows toward the reinforcement portion 5A that is situated on the first central axis C1, to be thereby molded as the fitting portion 4A shown in FIG. 29.

As such, in the conventional connector, the molten resin R flowed while detouring around the terminal accommodating portion 5C and thus had low filling performance. Therefore, there was a problem that the connector productivity was low. In addition, since the filling performance of the molten resin R was low, each portion of the first insulator 4 would need to be made thicker than a predetermined value, causing a problem with miniaturization of the connector.

Furthermore, as shown in FIG. 30, the reinforcement portion 5A of the first reinforcement terminal 5 bends, at an end portion rising from a bottom portion of the terminal accommodating portion 5C in the fitting direction DF, in the opposite direction from the terminal accommodating portion 5C along the first central axis C1, and as shown in FIG. 29, a portion of the first reinforcement terminal 5 rising from the terminal accommodating portion 5C in the fitting direction DF and reaching the reinforcement portion 5A is exposed from the fitting portion 4A of the first insulator 4. Hence, the first reinforcement terminal 5 sometimes had insufficient rigidity.

SUMMARY OF THE INVENTION

The present invention has been made to solve the conventional problems described above and is aimed at providing a connector that achieves the improved productivity and miniaturization while an insulator is molded integrally with a reinforcement terminal.

The present invention is also aimed at providing a connector that achieves the improved rigidity of a reinforcement terminal while an insulator is molded integrally with the reinforcement terminal.

A connector according to a first invention is a connector to be fitted to a counter connector along a fitting direction, the connector comprising:

a plurality of contacts made of metal material and arranged in an arrangement direction orthogonal to the fitting direction;

an insulator made of insulating resin material and holding the plurality of contacts; and a reinforcement terminal made of metal material and attached to an end portion of the insulator in the arrangement direction, wherein the insulator includes a fitting portion extending along the arrangement direction and projecting in the fitting direction for fitting to a portion to be fitted of the counter connector, the reinforcement terminal includes a terminal accommodating portion of recess shape for accommodating a reinforcement terminal of the counter connector, and a wall portion facing an end portion of the fitting portion in the arrangement direction across the terminal accommodating portion, and the reinforcement terminal has a resin material flow passage penetrating the wall portion and reaching the end portion of the fitting portion.

A connector according to a second invention is a connector to be fitted to a counter connector along a fitting direction, the connector comprising:

a plurality of contacts made of metal material and arranged in an arrangement direction orthogonal to the fitting direction;

an insulator made of insulating resin material and holding the plurality of contacts; and a reinforcement terminal made of metal material and attached to an end portion of the insulator in the arrangement direction, wherein the insulator includes a fitting portion extending along the arrangement direction and projecting in the fitting direction for fitting to a portion to be fitted of the counter connector, the reinforcement terminal includes:

a terminal accommodating portion of recess shape for accommodating a reinforcement terminal of the counter connector;

a wall portion facing an end portion of the fitting portion in the arrangement direction across the terminal accommodating portion;

a bottom plate portion joined to the wall portion and extending to the end portion of the fitting portion to form a bottom portion of the terminal accommodating portion; and a reinforcement portion, at the end portion of the fitting portion, joined to the bottom plate portion, bent so as to extend toward the wall portion, and exposed from the fitting portion in the fitting direction.

DETAILED DESCRIPTION OF THE INVENTION

An embodiment of the present invention is described below with reference to the accompanying drawings.

Figure 1:
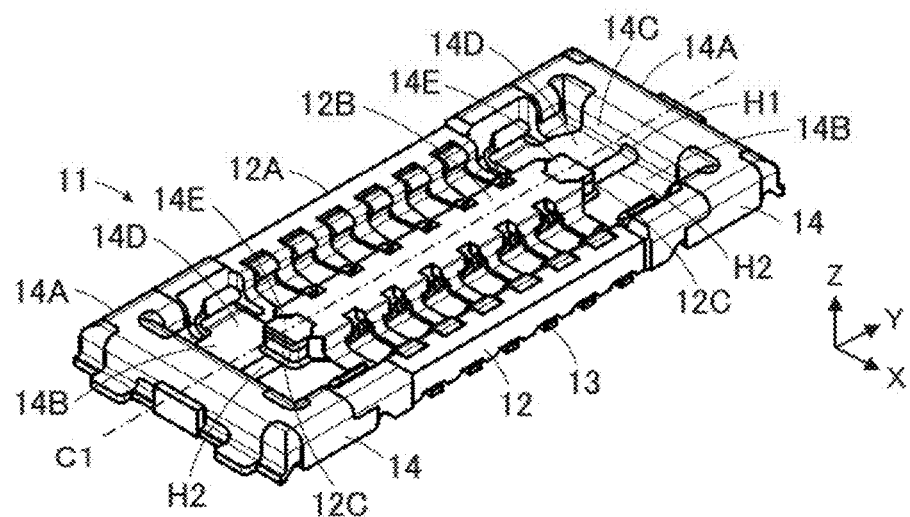
FIG. 1 is a perspective view of a receptacle connector according to an embodiment, when viewed from an obliquely upper position.
Figure 2:
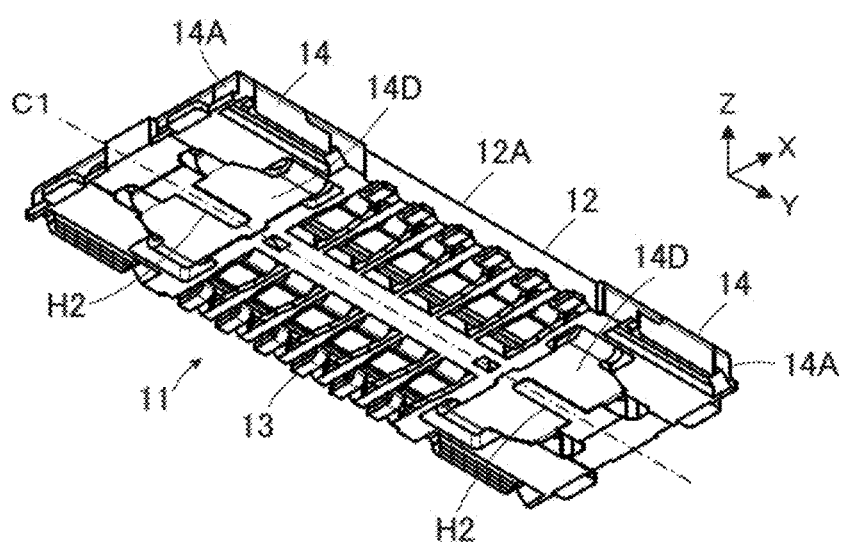
FIG. 2 is a perspective view of the receptacle connector, when viewed from an obliquely lower position.

FIGS. 1 and 2 are, respectively, a perspective view of a receptacle connector (connector) 11 according to the embodiment when viewed from an obliquely upper position and a perspective view of the receptacle connector 11 when viewed from an obliquely lower position. The receptacle connector 11 has a substantially rectangular flat plate shape extending along a first central axis C1.

The receptacle connector 11 includes a first insulator 12 extending along the first central axis C1, a plurality of first contacts 13 held by the first insulator 12 and arranged on each of opposite sides across the first central axis C1, and a pair of first reinforcement terminals 14 separately attached to opposite end portions along the first central axis C1 of the first insulator 12.

The first insulator 12 includes an outer wall portion 12A of rectangular frame shape formed so as to surround the periphery of the receptacle connector 11 and a fitting portion 12B of substantially cuboid shape extending along the first central axis C1 inside the outer wall portion 12A.

The plurality of first contacts 13 are arranged along the first central axis C1 and are each disposed so as to extend from the outer wall portion 12A to the fitting portion 12B of the first insulator 12 in a direction orthogonal to the first central axis C1. The pair of first reinforcement terminals 14 are each disposed so as to extend from the outer wall portion 12A to the fitting portion 12B of the first insulator 12 in a direction along the first central axis C1.

For convenience, the direction in which the first central axis C1 extends is called "Y direction," the direction in which the receptacle connector 11 of flat plate shape extends "XY plane," and the direction orthogonal to an XY plane "Z direction."

The plurality of first contacts 13 are arranged in the Y direction on each of opposite sides in the X direction across the first central axis C1, and the Y direction coincides with an arrangement direction of the first contacts 13.

The outer wall portion 12A and the fitting portion 12B of the first insulator 12 project in the +Z direction. In addition, the Z direction coincides with a fitting direction in which the receptacle connector 11 is fitted to a counter connector.

The pair of first reinforcement terminals 14 are separately disposed on opposite sides in the Y direction of the fitting portion 12B of the first insulator 12. Each first reinforcement terminal 14 is formed of a bent metal plate, includes a frame-shaped portion 14A forming an end portion in the Y direction of the receptacle connector 11, and has a recess-shaped terminal accommodating portion 14B formed inside the frame-shaped portion 14A.

The first reinforcement terminal 14 further includes a wall portion 14C joined to the frame-shaped portion 14A and extending along an XZ plane, a bottom plate portion 14D extending from the −Z directional end portion of the wall portion 14C to the Y directional end portion 12C of the fitting portion 12B of the first insulator 12 along an XY plane and forming a bottom portion of the terminal accommodating portion 14B, and a reinforcement portion 14E joined to the bottom plate portion 14D and disposed on a surface on the +Z direction side of the fitting portion 12B of the first insulator 12 at an end portion 12C in the Y direction to be exposed in the +Z direction.

The wall portion 14C of the first reinforcement terminal 14 is provided at the −Z directional end portion thereof with a first through hole H1 formed on the first central axis C1 and penetrating the wall portion 14C in the Y direction, i.e., the arrangement direction of the first contacts 13, while the bottom plate portion 14D of the first reinforcement terminal 14 is provided with a second through hole H2 formed along the first central axis C1, penetrating the bottom plate portion 14D in the Z direction, i.e., the fitting direction, and communicating with the first through hole H1. The second through hole H2 extends from the wall portion 14C in the Y direction to the end portion 12C of the fitting portion 12B of the first insulator 12.

The first through hole H1 and the second through hole H2 together form a resin material flow passage penetrating the wall portion 14C of the first reinforcement terminal 14 and reaching the end portion 12C of the fitting portion 12B and serve as a passage in which a molten resin that is a material for forming the first insulator 12 flows when the first insulator 12 is molded. The first through hole H1 and the second through hole H2 are exposed in the terminal accommodating portion 14B and are filled with part of the first insulator 12.

Figure 3:
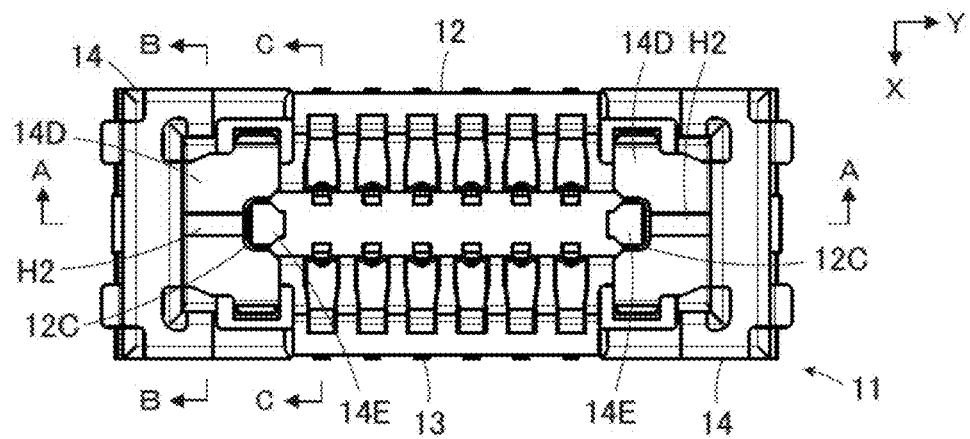
FIG. 3 is a plan view of the receptacle connector.
Figure 4:
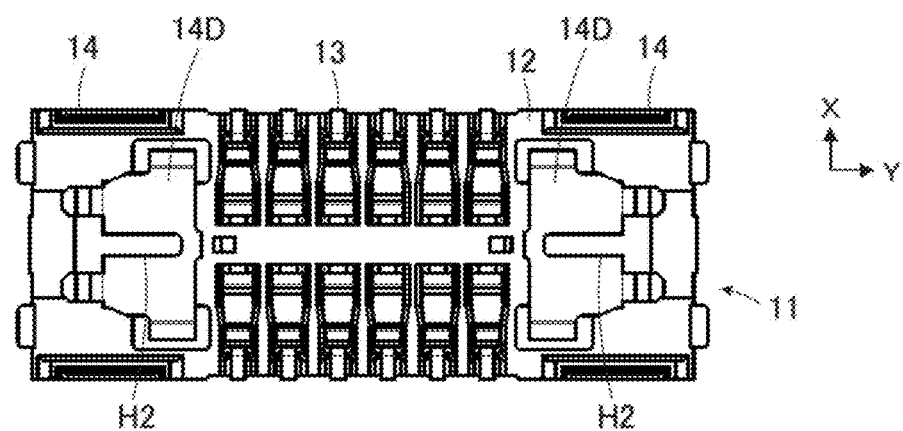
FIG. 4 is a bottom view of the receptacle connector.

FIGS. 3 and 4 are a plan view of the receptacle connector 11 when viewed from the +Z direction and a bottom view of the receptacle connector 11 when viewed from the −Z direction, respectively.

As shown in FIGS. 3 and 4, the bottom plate portion 14D of the first reinforcement terminal 14 is exposed both in the +Z direction and the −Z direction from the receptacle connector 11, and the second through hole H2 penetrates the bottom plate portion 14D in the Z direction. Accordingly, part of the first insulator 12 filling the inside of the second through hole H2 is exposed both in the +Z direction and the −Z direction.

Figure 5:
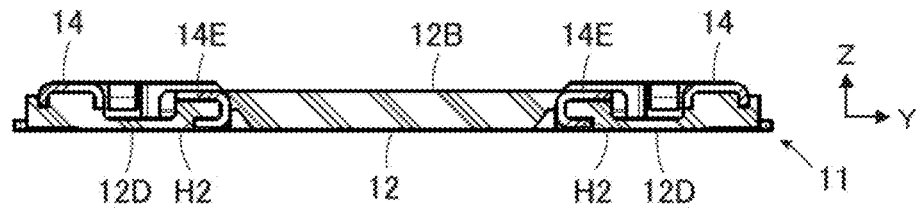
FIG. 5 is a cross-sectional view taken along line A-A in FIG. 3.
Figure 6:
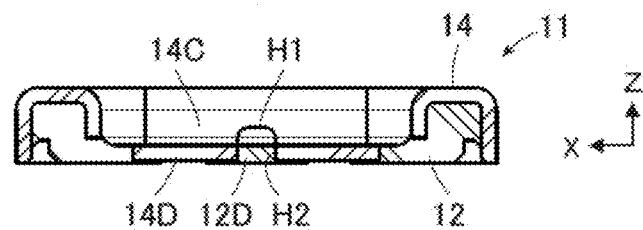
FIG. 6 is a cross-sectional view taken along line B-B in FIG. 3.

FIG. 5 is a cross-sectional view taken along line A-A in FIG. 3, and FIG. 6 is a cross-sectional view taken along line B-B in FIG. 3.

Since part of the first insulator 12 fills the inside of the second through hole H2, as shown in FIG. 5, the first insulator 12 has an extending portion 12D disposed in the second through hole H2 of the first reinforcement terminal 14 and having a thickness equivalent to the thickness of the metal plate that forms the first reinforcement terminal 14. As shown in FIG. 6, the extending portion 12D has a width equivalent to the X directional width of the second through hole H2 of the first reinforcement terminal 14. Meanwhile, the first through hole H1 in the wall portion 14C of the first reinforcement terminal 14 shown in FIG. 6 is also filled with part of the first insulator 12 connected to the extending portion 12D.

Figure 7:
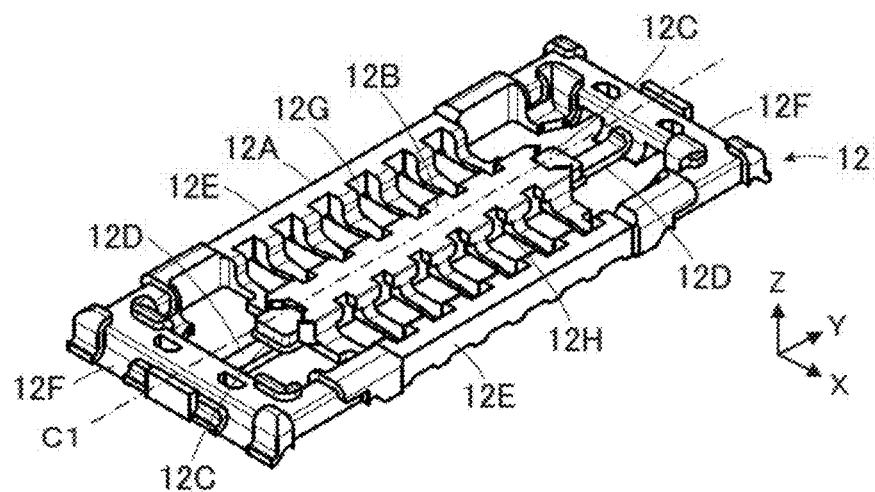
FIG. 7 is a perspective view of a first insulator used in the receptacle connector.

FIG. 7 illustrates a perspective view of the first insulator 12. The rectangular frame-shaped outer wall portion 12A of the first insulator 12 includes a pair of long side portions 12E extending in the Y direction and facing each other in the X direction and a pair of short side portions 12F extending in the X direction and facing each other in the Y direction. At the middle position between the pair of long side portions 12E, the fitting portion 12B extends in the Y direction parallel to the long side portions 12E.

The pair of short side portions 12F separately situated at the +Y directional end portion and the −Y directional end portion of the outer wall portion 12A are parts each covered by the frame-shaped portion 14A of the corresponding first reinforcement terminal 14.

The pair of long side portions 12E separately situated at the +X directional end portion and the −X directional end portion of the outer wall portion 12A are each provided with a plurality of contact accommodating grooves 12G arranged in the Y direction. Here, the fitting portion 12B of the first insulator 12 is also provided with a plurality of contact accommodating grooves 12H corresponding to the plurality of contact accommodating grooves 12G of the long side portions 12E.

Figure 8:
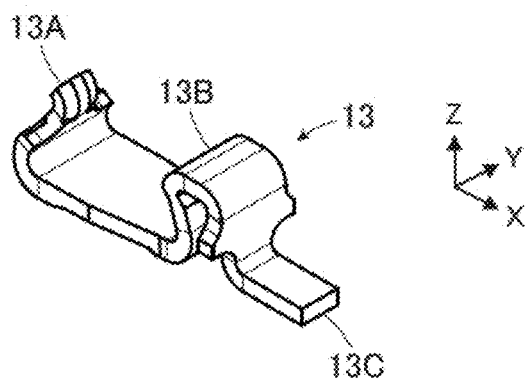
FIG. 8 is a perspective view of a first contact used in the receptacle connector.

FIG. 8 illustrates a perspective view of the first contact 13. The first contact 13 is formed of a bent metal plate and includes a contact portion 13A disposed at an end in the X direction, another contact portion 13B separated from the contact portion 13A in the X direction and disposed so as to face the contact portion 13A in the X direction, and a substrate connection portion 13C disposed on the other end in the X direction. The two contact portions 13A and 13B facing each other constitute elastically deformable spring contacts.

Figure 9:
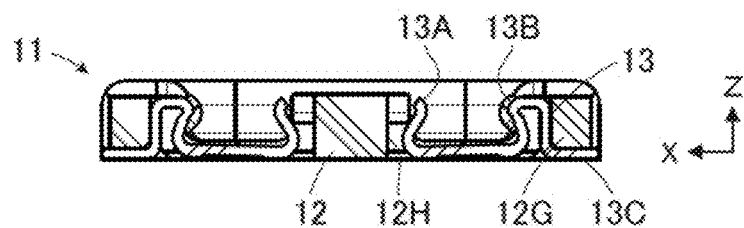
FIG. 9 is a cross-sectional view taken along line C-C in FIG. 3.

FIG. 9 is a cross-sectional view taken along line C-C in FIG. 3, and the first contact 13 is press-fitted from the −Z direction into the corresponding contact accommodating grooves 12G and 12H of the first insulator 12 to be thereby held by the first insulator 12.

Figure 10:
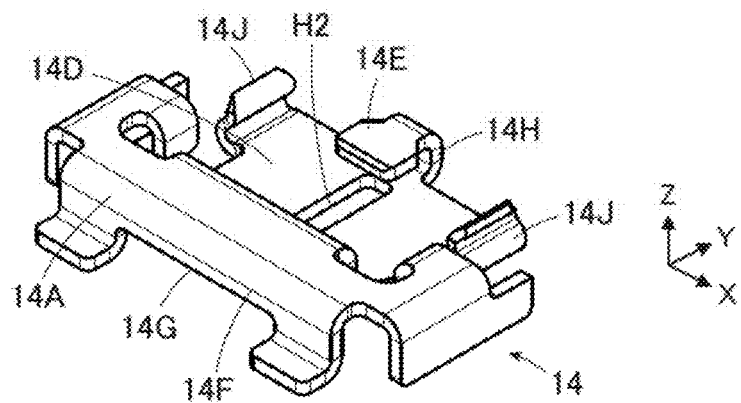
FIG. 10 is a perspective view of a first reinforcement terminal used in the receptacle connector, when viewed from an obliquely upper position.
Figure 11:
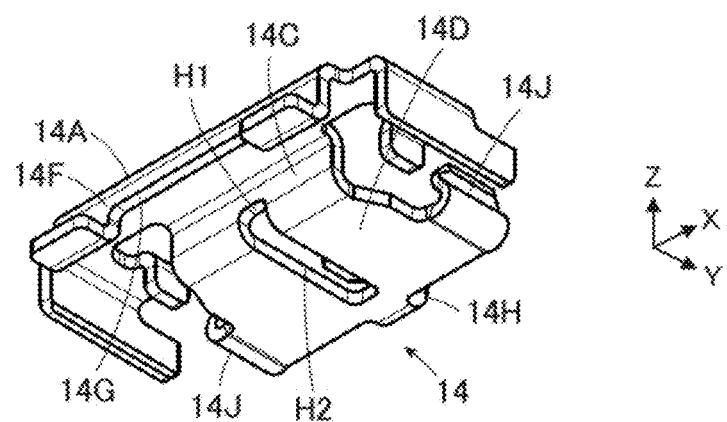
FIG. 11 is a perspective view of the first reinforcement terminal, when viewed from an obliquely lower position.

FIGS. 10 and 11 each illustrate one of the pair of first reinforcement terminals 14 of the receptacle connector 11, the one reinforcement terminal 14 being attached to the −Y directional end portion of the first insulator 12. FIG. 10 is a perspective view of the first reinforcement terminal 14 when viewed from an obliquely upper position, and FIG. 11 is a perspective view of the first reinforcement terminal 14 when viewed from an obliquely lower position.

The first reinforcement terminal 14 includes the frame-shaped portion 14A, the wall portion 14C joined to the frame-shaped portion 14A and extending along an XZ plane, and the bottom plate portion 14D extending from the −Z directional end portion of the wall portion 14C along an XY plane. The wall portion 14C is joined to the −Y directional end portion of the bottom plate portion 14D, and the first through hole H1 formed at the −Z directional end portion of the wall portion 14C and the second through hole H2 formed in the bottom plate portion 14D communicate with each other.

At the −Y directional end portion of the frame-shaped portion 14A, a wall portion 14F is disposed so as to extend along an XZ plane and face the wall portion 14C in which the first through hole H1 is formed, and the wall portion 14F is provided at its −Z directional end portion with a cutout 14G opening in the −Z direction.

In addition, the bottom plate portion 14D is provided at its +Y directional end portion at its center part in the X direction with a rising portion 14H rising in the +Z direction, and the +Z directional end portion of the rising portion 14H is bent so as to extend in the −Y direction toward the wall portion 14C to thereby form the reinforcement portion 14E.

The reinforcement portion 14E extends along an XY plane so as to overlap, in the Z direction, a portion on the +Y direction side of the second through hole H2 formed in the bottom plate portion 14D.

In addition, a pair of connection portions 14J are formed separately at the +X directional end portion and the −X directional end portion at the +Y directional end portion of the bottom plate portion 14D to project in the +Z direction. The pair of connection portions 14J constitute elastically deformable spring contacts.

Figure 12:
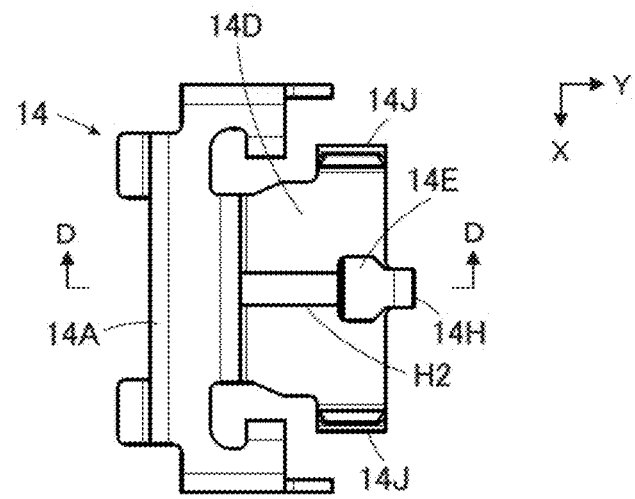
FIG. 12 is a plan view of the first reinforcement terminal.
Figure 13:
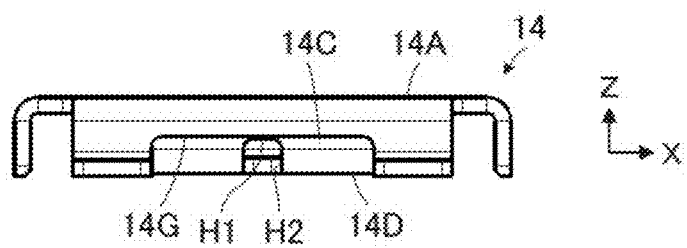
FIG. 13 is a side view of the first reinforcement terminal.
Figure 14:
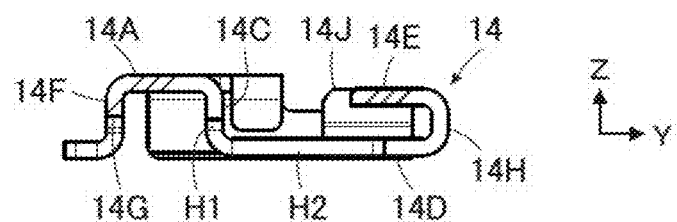
FIG. 14 is a cross-sectional view taken along line D-D in FIG. 12.

FIG. 12 is a plan view of the first reinforcement terminal 14 when viewed from the +Z direction, FIG. 13 is a side view of the first reinforcement terminal 14 when viewed from the −Y direction, and FIG. 14 is a cross-sectional view taken along line D-D in FIG. 12.

As shown in FIGS. 12 and 14, the pair of connection portions 14J are situated at the same position in the Y direction as the reinforcement portion 14E and are separately disposed on opposite sides in the X direction of the reinforcement portion 14E.

As shown in FIGS. 13 and 14, the first through hole H1 of the wall portion 14C and the second through hole H2 of the bottom plate portion 14D are exposed in the −Y direction via the cutout 14G of the wall portion 14F. The first through hole H1 and the second through hole H2 communicating with each other serve as a resin material flow passage in which a molten resin that is a material for forming the first insulator 12 flows when the first insulator 12 is molded.

Figure 15:
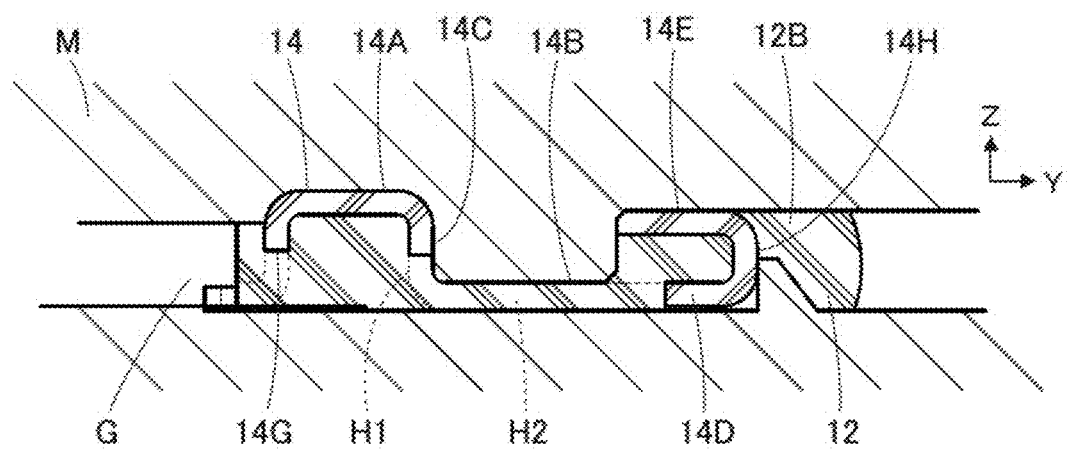
FIG. 15 is a cross-sectional view of the first reinforcement terminal and a flow of a molten resin in a molding process.

Here, as shown in FIG. 15, the first reinforcement terminal 14 is preliminarily arranged in a mold M, and a molten resin that is a material for forming the first insulator 12 is then poured into the mold M, whereby the first insulator 12 is molded integrally with the first reinforcement terminal 14 through the so-called insert-molding.

In this process, for example, when a gate G of the mold M is set on the −Y direction side of the cutout 14G formed in the frame-shaped portion 14A of the first reinforcement terminal 14, and the mold M is clamped, an inner surface of the mold M contacts the +Z direction-side surfaces of the frame-shaped portion 14A, the bottom plate portion 14D and the reinforcement portion 14E of the first reinforcement terminal 14, and, in this state, a molten resin that is a material for forming the first insulator 12 is poured through the gate G.

At this time, the molten resin passes the cutout 14G of the first reinforcement terminal 14 to flow into the inside of the frame-shaped portion 14A, further passes the first through hole H1 of the wall portion 14C and the second through hole H2 of the bottom plate portion 14D, the first through hole H1 and the second through hole H2 being exposed in the −Y direction via the cutout 14G, to reach the reinforcement portion 14E, and flows in the +Y direction while passing the opposite sides in the X direction of the rising portion 14H. The fitting portion 12B of the first insulator 12 is formed in this manner. In other words, the molten resin does not flow in the +X direction and the −X direction to detour around the terminal accommodating portion 14B of the first reinforcement terminal 14 but flows in the +Y direction while passing the first through hole H1 of the wall portion 14C and then the second through hole H2 of the bottom plate portion 14D forming the bottom portion of the terminal accommodating portion 14B along the first central axis C1, to thereby form the fitting portion 12B.

Hence, the molten resin smoothly flows to fill the inside of the mold M, whereby the receptacle connector 11 can be produced with excellent productivity.

In addition, since the filling performance of the molten resin is improved, a thicknesses of each portion of the first insulator 12 can be suppressed to a smaller level, and, as a result, miniaturization, in particular, thickness reduction of the receptacle connector 11 can be achieved.

As shown in FIG. 10, since the reinforcement portion 14E of the first reinforcement terminal 14 is bent so as to extend from the +Z directional end portion of the rising portion 14H toward the wall portion 14C, the pair of connection portions 14J can be disposed separately on opposite sides in the X direction of the reinforcement portion 14E to be situated at the same position in the Y direction as the reinforcement portion 14E. That is, the end portion 12C of the fitting portion 12B of the first insulator 12 shown in FIGS. 1 and 3 is also situated at the same position in the Y direction as the reinforcement portion 14E and the pair of connection portions 14J. Accordingly, the size reduction in the Y direction of the receptacle connector 11 can be achieved.

Moreover, the reinforcement portion 14E is integrated with the first insulator 12 while the reinforcement portion 14E is bent so as to extend from the +Z directional end portion of the rising portion 14H toward the wall portion 14C and is disposed on the surface on the +Z direction side of the end portion 12C of the fitting portion 12B, and the rising portion 14H is embedded in the fitting portion 12B of the first insulator 12. Hence, the rigidity of the first reinforcement terminal 14 is improved.

Figure 16:
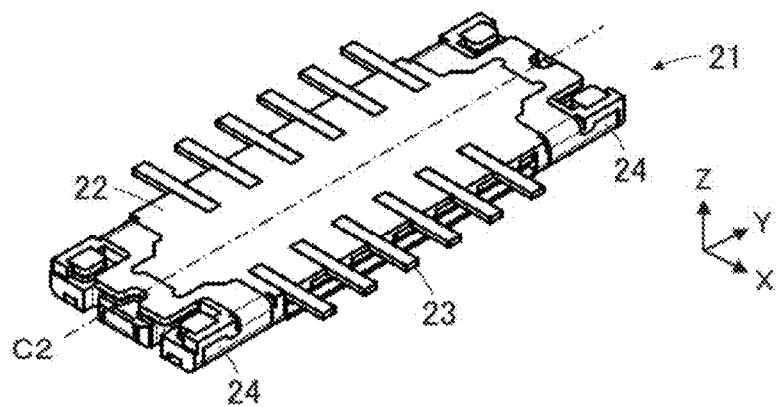
FIG. 16 is a perspective view of a plug connector that serves as a counter connector, when viewed from an obliquely upper position.
Figure 17:
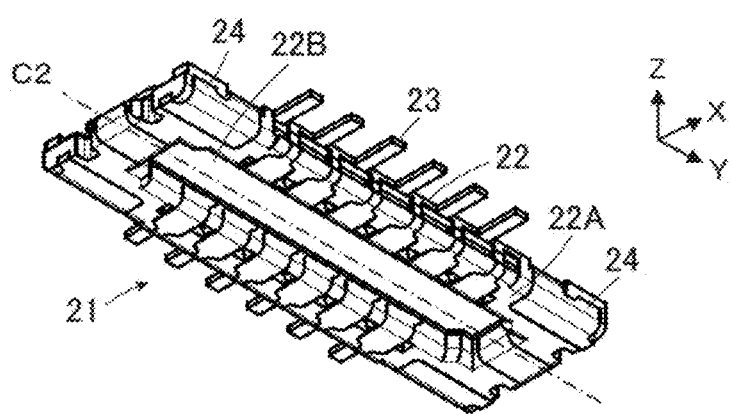
FIG. 17 is a perspective view of the plug connector, when viewed from an obliquely lower position.

A plug connector 21 that serves as a counter connector for the receptacle connector 11 is shown in FIGS. 16 and 17. FIG. 16 is a perspective view of the plug connector 21 when viewed from an obliquely upper position, and FIG. 17 is a perspective view of the plug connector 21 when viewed from an obliquely lower position. The plug connector 21 has a substantially rectangular flat plate shape extending in the Y direction along a second central axis C2.

The plug connector 21 includes a second insulator 22 extending along the second central axis C2, a plurality of second contacts 23 held by the second insulator 22 and arranged on each of opposite sides across the second central axis C2, and a pair of second reinforcement terminals 24 separately attached to the +Y directional end portion and the −Y directional end portion of the second insulator 22.

The second insulator 22 includes a bulging portion 22A surrounding the periphery of the plug connector 21 and bulging in the −Z direction and a recess-shaped portion to be fitted 22B extending along the second central axis C2 inside the bulging portion 22A.

The plurality of second contacts 23 are arranged in the Y direction along the second central axis C2 and are each disposed at the bulging portion 22A of the second insulator 22 so as to extend in the X direction. The pair of second reinforcement terminals 24 are integrated with the second insulator 22 independently at the +Y directional end portion and the −Y directional end portion of the second insulator 22.

Figure 18:
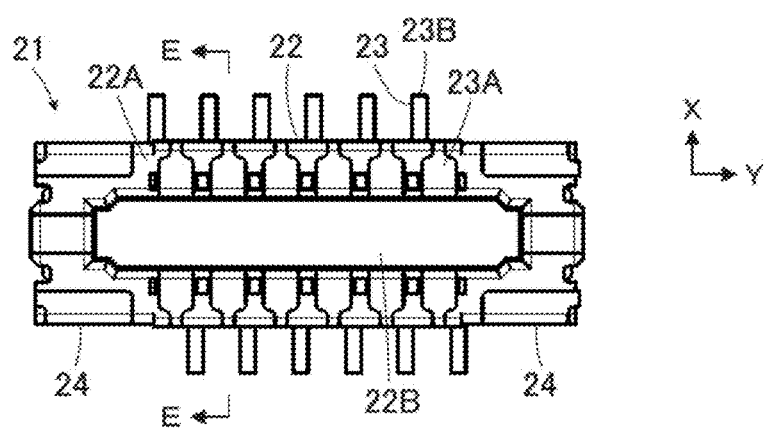
FIG. 18 is a bottom view of the plug connector.
Figure 19:
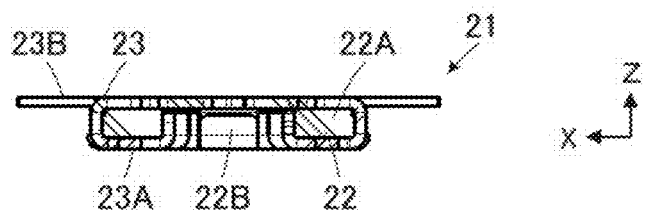
FIG. 19 is a cross-sectional view taken along line E-E in FIG. 18.

FIG. 18 is a bottom view of the plug connector 21 when viewed from the −Z direction, and FIG. 19 is a cross-sectional view taken along line E-E in FIG. 18.

As shown in FIGS. 18 and 19, the plurality of second contacts 23 are disposed at the bulging portion 22A on each of opposite sides in the X direction of the portion to be fitted 22B of the second insulator 22 across the portion to be fitted 22B.

Figure 20:
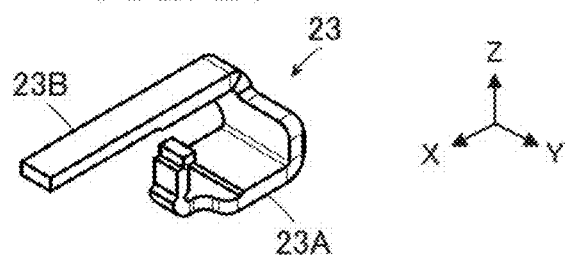
FIG. 20 is a perspective view of a second contact used in the plug connector.
Figure 21:
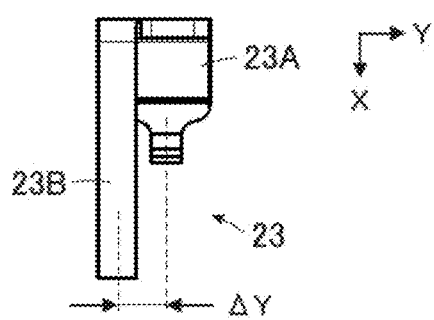
FIG. 21 is a plan view of the second contact.

FIG. 20 is a perspective view of a second contact 23. The second contact 23 is formed of a bent metal plate and includes a contact portion 23A bent into a substantial U-shape as viewed from the Y direction, and a substrate connection portion 23B extending in the X direction on the +Z direction side of the contact portion 23A. FIG. 21 is a plan view of the second contact 23 when viewed from the +Z direction. As shown in FIG. 21, the contact portion 23A and the substrate connection portion 23B are disposed to be offset from each other in the Y direction by an offset amount Δ.

Accordingly, as shown in FIG. 18, while contact portions 23A of the plurality of second contacts 23 arranged on one of opposite sides in the X direction of the portion to be fitted 22B of the second insulator 22 are situated at the same positions in the Y direction as contact portions 23A arranged on the other side, substrate connection portions 23B of the plurality of second contacts 23 arranged on one of opposite sides in the X direction of the portion to be fitted 22B of the second insulator 22 are situated at offset positions in the Y direction from substrate connection portions 23B arranged on the other side.

Figure 22:
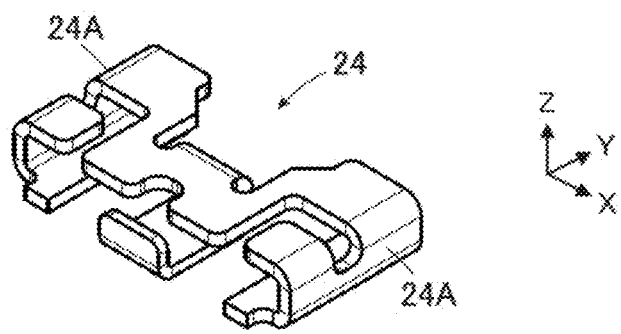
FIG. 22 is a perspective view of a second reinforcement terminal used in the plug connector.

FIG. 22 is a perspective view of, among the pair of second reinforcement terminals 24 of the plug connector 21, a second reinforcement terminal 24 attached to the −Y directional end portion of the second insulator 22, when viewed from an obliquely upper position.

The second reinforcement terminal 24 is formed of a bent metal plate and has an outer shape which allows the second reinforcement terminal 24 to be accommodated in the recess-shaped terminal accommodating portion 14B formed in the first reinforcement terminal 14 of the receptacle connector 11 shown in FIG. 1. In addition, at the +X directional end portion and the −X directional end portion of the second reinforcement terminal 24, a pair of connection portions 24A are separately formed to face in the +X direction and in the −X direction.

Figure 23:
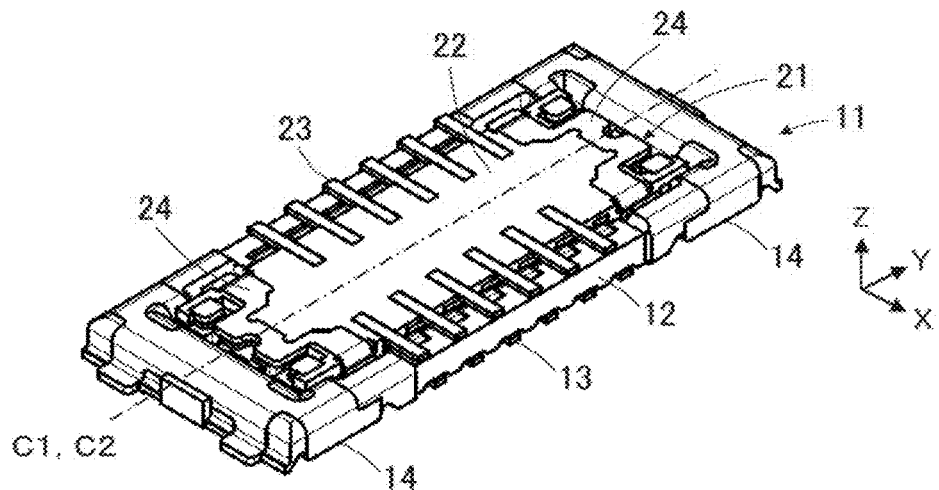
FIG. 23 is a perspective view of the receptacle connector and the plug connector in a fitting state, when viewed from an obliquely upper position.
Figure 24:
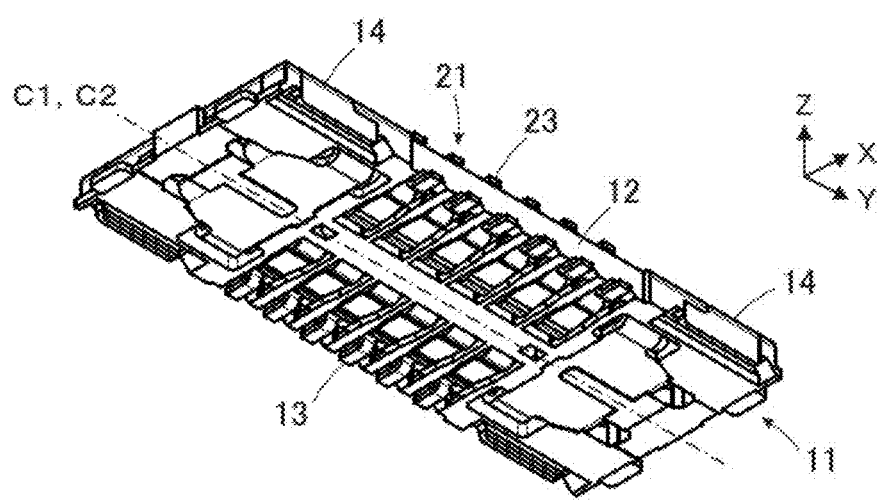
FIG. 24 is a perspective view of the receptacle connector and the plug connector in the fitting state, when viewed from an obliquely lower position.
Figure 25:
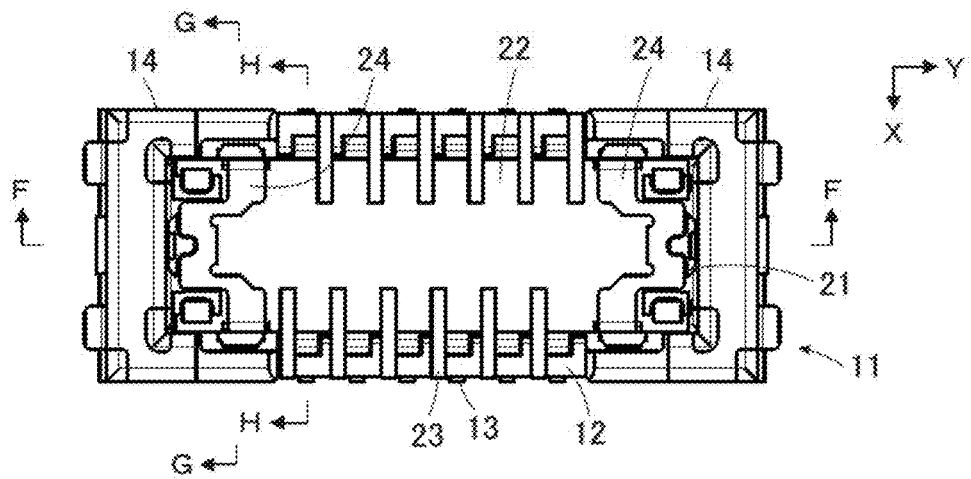
FIG. 25 is a plan view of the receptacle connector and the plug connector in the fitting state.

FIGS. 23 and 24 are perspective views of the receptacle connector 11 and the plug connector 21 in a fitting state when viewed from an obliquely upper position and when viewed from an obliquely lower position, respectively. FIG. 25 is a plan view of the receptacle connector 11 and the plug connector 21 in a fitting state when viewed from the +Z direction.

When the plug connector 21 is pushed into the receptacle connector 11 from the +Z direction such that the first central axis C1 of the receptacle connector 11 coincides with the second central axis C2 of the plug connector 21, the bulging portion 22A of the plug connector 21 shown in FIG. 17 enters the inner side of the frame-shaped outer wall portion 12A of the receptacle connector 11 shown in FIG. 1, whereby the receptacle connector 11 and the plug connector 21 are fitted to each other.

Figure 26:
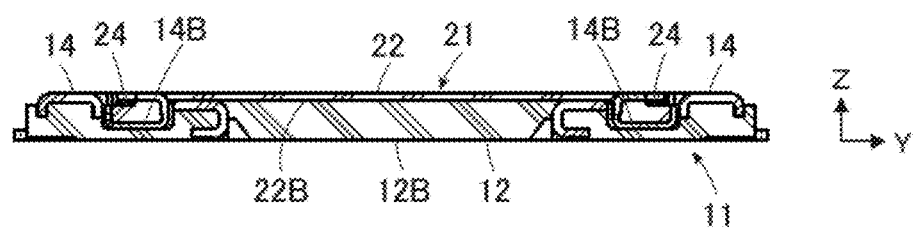
FIG. 26 is a cross-sectional view taken along line F-F in FIG. 25.

FIG. 26 is a cross-sectional view taken along line F-F in FIG. 25. As shown in FIG. 26, in the fitting state of the receptacle connector 11 and the plug connector 21, the fitting portion 12B of the receptacle connector 11 is fitted in the recess-shaped portion to be fitted 22B of the plug connector 21, and further, the pair of second reinforcement terminals 24 of the plug connector 21 are accommodated in the recess-shaped terminal accommodating portions 14B of the pair of first reinforcement terminals 14 of the receptacle connector 11.

In this manner, a thin connector assembly is formed using the receptacle connector 11 and the plug connector 21.

Figure 27:
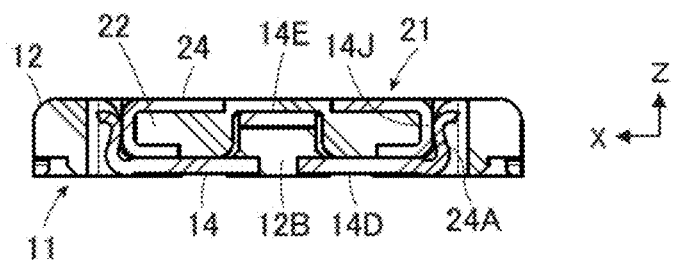
FIG. 27 is a cross-sectional view taken along line G-G in FIG. 25.

FIG. 27 is a cross-sectional view taken along line G-G in FIG. 25. As shown in FIG. 27, the second reinforcement terminal 24 of the plug connector 21 is accommodated in the recess-shaped terminal accommodating portion 14B of the first reinforcement terminal 14 of the receptacle connector 11, whereby the pair of connection portions 24A of the second reinforcement terminal 24 are held between the pair of connection portions 14J of the first reinforcement terminal 14. Since the pair of connection portions 14J of the first reinforcement terminal 14 constitute the elastically deformable spring contacts, the connection portions 24A of the second reinforcement terminal 24 come into contact with the connection portions 14J of the first reinforcement terminal 14 with predetermined contact pressure, whereby the first reinforcement terminal 14 of the receptacle connector 11 and the second reinforcement terminal 24 of the plug connector 21 are electrically connected to each other.

As shown in FIG. 10, the reinforcement portion 14E of the first reinforcement terminal 14 of the receptacle connector 11 is bent so as to extend from the +Z directional end portion of the rising portion 14H toward the wall portion 14C. If the pair of connection portions 14J are disposed at the same positions in the Y direction as the reinforcement portion 14E with the reinforcement portion 14E being bent so as to extend from the +Z directional end portion of the rising portion 14H toward the center part in the Y direction of the receptacle connector 11, formation of a slit or the like between the reinforcement portion 14E and each of the pair of connection portions 14J would be needed, narrowing the width of a region of the bottom plate portion 14D extending from the frame-shaped portion 14A to reach the pair of connection portions 14J.

In the receptacle connector 11 of the present invention, on the other hand, since the reinforcement portion 14E is bent so as to extend from the +Z directional end portion of the rising portion 14H toward the wall portion 14C, a wide region of the bottom plate portion 14D extending from the frame-shaped portion 14A to reach the pair of connection portions 14J can be assured. Accordingly, when the first reinforcement terminal 14 of the receptacle connector 11 is electrically connected to the second reinforcement terminal 24 of the plug connector 21 via the pair of connection portions 14J, resistance of the current path passing the first reinforcement terminal 14 can be lowered, and the receptacle connector 11 having high reliability can be achieved.

Figure 28:
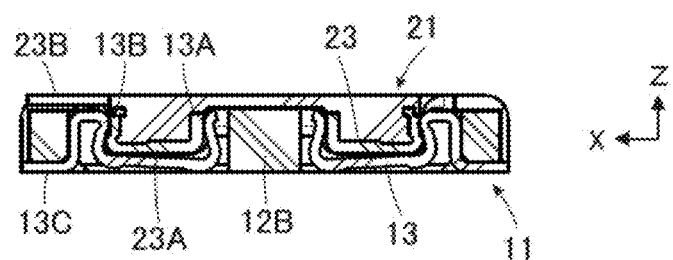
FIG. 28 is a cross-sectional view taken along line H-H in FIG. 25.
Figure 29:
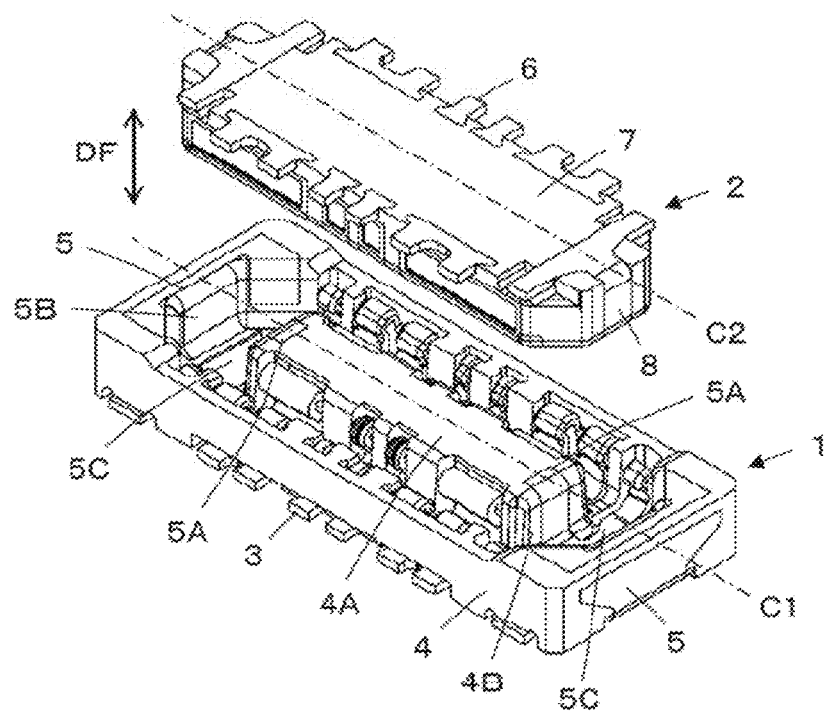
FIG. 29 is a perspective view of a conventional receptacle connector and a conventional plug connector before fitting.
Figure 30:
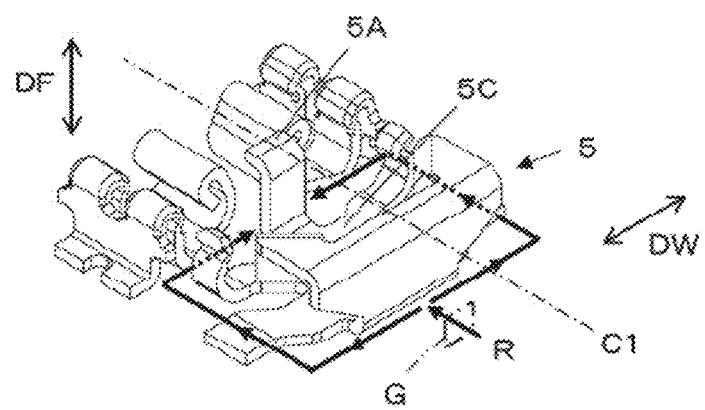
FIG. 30 is a perspective view of a first reinforcement terminal and a flow of a molten resin in a molding process of the conventional receptacle connector.

FIG. 28 is a cross-sectional view taken along line H-H in FIG. 25. As shown in FIG. 28, when the receptacle connector 11 and the plug connector 21 are fitted to each other, the contact portions 23A bent into U-shape of the second contacts 23 of the plug connector 21 independently enter and are held between the contact portions 13A and 13B facing each other in the X direction of the corresponding first contacts 13 of the receptacle connector 11. In this way, the contact portions 23A of the second contacts 23 come into contact with the contact portions 13A and 13B of the first contacts 13 constituting the elastically deformable spring portions with predetermined contact pressure, and the first contacts 13 of the receptacle connector 11 are electrically connected to the second contacts 23 of the plug connector 21.

It should be noted that by mounting the receptacle connector 11 on a first substrate (not shown) and the plug connector 21 on a second substrate (not shown), the receptacle connector 11 and the plug connector 21 can be used as a substrate-to-substrate connector. In this case, the substrate connection portions 13C of the first contacts 13 of the receptacle connector 11 are fixed to a plurality of connection pads on the first substrate through soldering or another method, and the substrate connection portions 23B of the second contacts 23 of the plug connector 21 are fixed to a plurality of connection pads on the second substrate through soldering or another method.

In the embodiment described above, the first contacts 13 of the receptacle connector 11 are arranged in two arrays on opposite sides across the first central axis C1, and the second contacts 23 of the plug connector 21 are arranged in two arrays on opposite sides across the second central axis C2. However, the first contacts 13 and the second contacts 23 each do not have to be arranged in two arrays but may be arranged in one array.

In addition, the numbers of the first contacts 13 and the second contacts 23 are not limited to those shown in the drawings.

Moreover, in the embodiment described above, the receptacle connector 11 includes the pair of first reinforcement terminals 14 separately disposed on opposite sides along the first central axis C1, and the plug connector 21 includes the pair of second reinforcement terminals 24 separately disposed on opposite sides along the second central axis C2. However, this is not the sole case, and, for example, the receptacle connector 11 may have one first reinforcement terminal 14, and the plug connector 21 may have one second reinforcement terminal 24.

What is claimed is:

1. A connector to be fitted to a counter connector along a fitting direction, the connector comprising:
    a plurality of contacts made of metal material and arranged in an arrangement direction orthogonal to the fitting direction;
    an insulator made of insulating resin material and holding the plurality of contacts; and
    a reinforcement terminal made of metal material and attached to an end portion of the insulator in the arrangement direction,
    wherein the insulator comprises a fitting portion extending along the arrangement direction and projecting in the fitting direction for fitting to a portion to be fitted of the counter connector,
    the reinforcement terminal comprises a terminal accommodating portion of recess shape for accommodating a reinforcement terminal of the counter connector, and a wall portion facing an end portion of the fitting portion in the arrangement direction across the terminal accommodating portion, and
    the reinforcement terminal comprises a resin material flow passage penetrating the wall portion and reaching the end portion of the fitting portion.

2. The connector according to claim 1,
    wherein the reinforcement terminal comprises a bottom plate portion joined to the wall portion and extending to the end portion of the fitting portion to form a bottom portion of the terminal accommodating portion, and
    the resin material flow passage is formed of a first through hole penetrating the wall portion in the arrangement direction and a second through hole communicating with the first through hole and penetrating the bottom plate portion in the fitting direction.

3. The connector according to claim 2, wherein the second through hole extends from the wall portion to the end portion of the fitting portion along the arrangement direction.

4. The connector according to claim 2, wherein the bottom plate portion comprises a pair of connection portions separately disposed on opposite sides in a width direction of a reinforcement portion, the width direction being orthogonal to both the fitting direction and the arrangement direction, and electrically connected to the reinforcement terminal of the counter connector when the connector is fitted to the counter connector.

5. The connector according to claim 4, wherein the connection portions constitute elastically deformable spring contacts.

6. The connector according to claim 1, wherein the reinforcement terminal comprises a frame-shaped portion forming an end portion of the connector, and
    the wall portion is joined to the frame-shaped portion.

7. The connector according to claim 1, wherein the plurality of contacts are arranged separately on each of opposite sides in a width direction of the fitting portion, the width direction being orthogonal to both the fitting direction and the arrangement direction.

8. A connector to be fitted to a counter connector along a fitting direction, the connector comprising:
    a plurality of contacts made of metal material and arranged in an arrangement direction orthogonal to the fitting direction;
    an insulator made of insulating resin material and holding the plurality of contacts; and
    a reinforcement terminal made of metal material and attached to an end portion of the insulator in the arrangement direction,
    wherein the insulator comprises a fitting portion extending along the arrangement direction and projecting in the fitting direction for fitting to a portion to be fitted of the counter connector,
    the reinforcement terminal comprises:
    a terminal accommodating portion of recess shape for accommodating a reinforcement terminal of the counter connector;
    a wall portion facing an end portion of the fitting portion in the arrangement direction across the terminal accommodating portion;
    a bottom plate portion joined to the wall portion and extending to the end portion of the fitting portion to form a bottom portion of the terminal accommodating portion; and
    a reinforcement portion, at the end portion of the fitting portion, joined to the bottom plate portion, bent so as to extend toward the wall portion, and exposed from the fitting portion in the fitting direction,
    wherein the wall portion is joined to one end portion of the bottom plate portion in the arrangement direction,
    the reinforcement terminal comprises a rising portion rising in the fitting direction from another end portion of the bottom plate portion in the arrangement direction,
    the reinforcement portion is bent so as to extend from an end portion of the rising portion in the fitting direction toward the wall portion, and
    the rising portion is embedded in the fitting portion, and
    the bottom plate portion comprises a pair of connection portions separately disposed on opposite sides in a width direction of the reinforcement portion, the width direction being orthogonal to both the fitting direction and the arrangement direction, and electrically connected to the reinforcement terminal of the counter connector when the connector is fitted to the counter connector.

9. The connector according to claim 8, wherein the connection portions constitute elastically deformable spring contacts.

10. The connector according to claim 8, wherein the reinforcement terminal comprises a frame-shaped portion forming an end portion of the connector, and the wall portion is joined to the frame-shaped portion.

11. The connector according to claim 8, wherein the plurality of contacts are arranged separately on each of opposite sides in the width direction of the fitting portion, the width direction being orthogonal to both the fitting direction and the arrangement direction.

\* \* \* \* \*